R. DELAUNAY-BELLEVILLE.
VALVE.
APPLICATION FILED MAY 7, 1913.
1,164,268.
Patented Dec. 14, 1915.
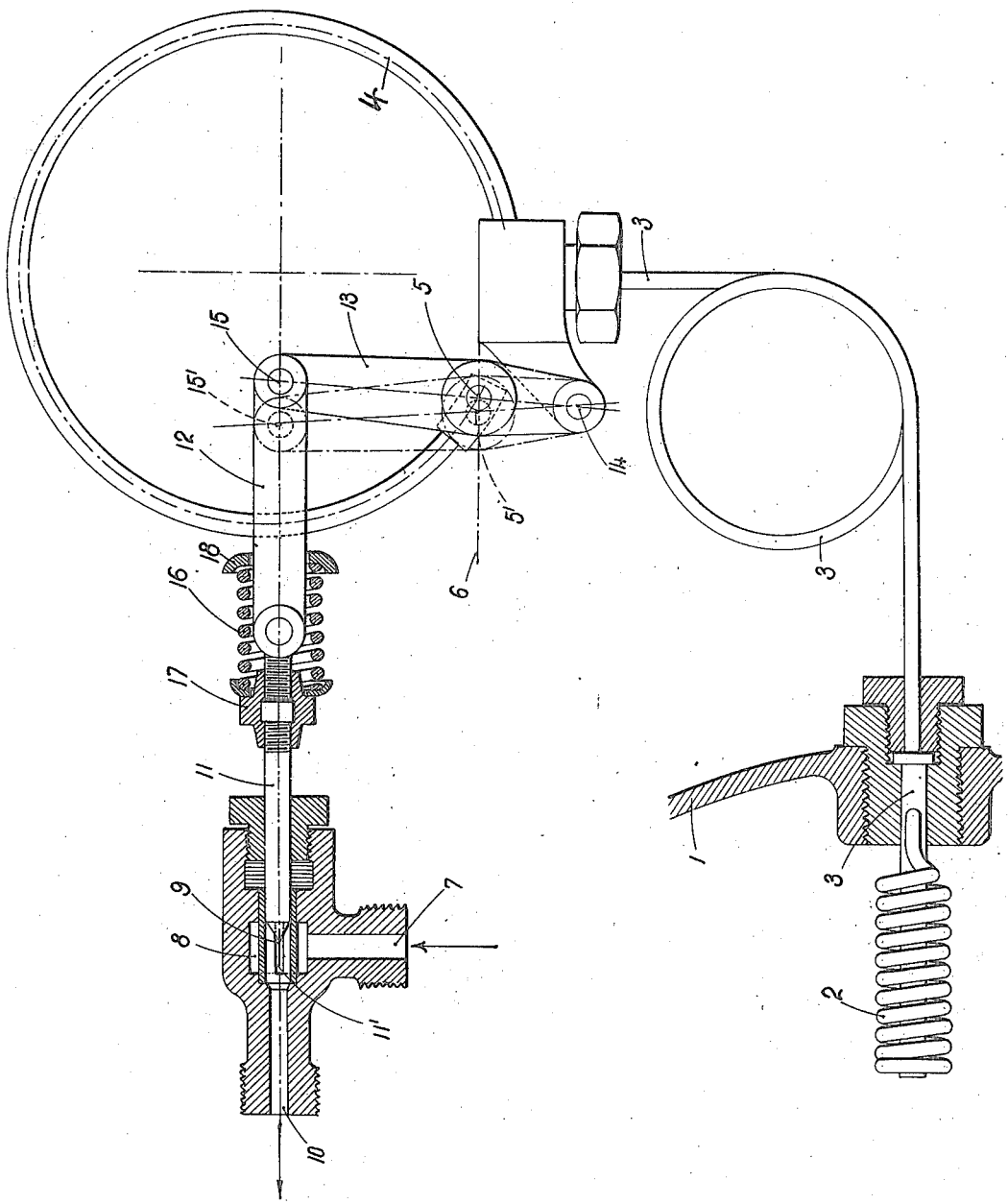

UNITED STATES PATENT OFFICE.

ROBERT DELAUNAY-BELLEVILLE, OF ST.-DENIS, FRANCE, ASSIGNOR TO SOCIETE ANONYME DES ETABLISSEMENTS DELAUNAY-BELLEVILLE, OF ST.-DENIS, FRANCE, A CORPORATION OF FRANCE.

VALVE.

1,164,268.        Specification of Letters Patent.        Patented Dec. 14, 1915.

Application filed May 7, 1913. Serial No. 766,112.

*To all whom it may concern:*

Be it known that I, ROBERT DELAUNAY-BELLEVILLE, citizen of the French Republic, residing at St Denis, Department of the Seine, in France, have invented certain new and useful Improvements in Valves, and I do hereby declare the following to be a full, clear, and exact description of the invention, such as will enable others skilled in the art to which it appertains to make and use the same.

This invention relates to temperature regulators, and has for its object to provide such a device having the novel features of construction and operation hereinafter set forth.

The specific form of the temperature regulator herein disclosed was designed for use in combination with the generator of a torpedo, but as will hereinafter appear, it may be used in other relations where it is desired to control the temperature of a fluid by automatically varying the supply of fuel to the fluid heating means, in accordance with the changes in temperature of the fluid.

The invention consists in providing a tube containing a vaporizable liquid, which tube is subjected to the heat of the fluid whose temperature is to be controlled. This tube is connected to a Bourdon tube, the free end of which moves in accordance with the internal pressure and is connected by means of levers with a member which controls the admission of fuel to the fluid heating means, a spring being provided to balance the thrust exerted by the fuel on the end of the control member. A rigid and direct transmission device, free from play or lost motion is employed between the free end of the Bourdon tube and the control member, this transmission device comprising an oscillating lever to which the free end of the Bourdon tube is attached and to which is also connected a slide valve, such that the output of the fuel is regulated in proportion to the travel of the free end of the Bourdon tube. The valve is so constructed that the passage of the fuel therethrough will vary in direct proportion to the movement of the valve, and this feature, in combination with the features of construction above stated, produce a temperature regulator capable of maintaining the temperature of any fluid constant at all times.

When used in combination with the generator of a torpedo, the above-mentioned tube containing the vaporizable liquid is so positioned as to be subjected to the heat of the gases in the torpedo generator, and the valve is employed to control the supply of fluid fuel to the generator. It is, therefore, obvious that the valve will be actuated to admit more or less fuel to the generator in accordance with the temperature of the gases of the generator.

The accompanying drawing shows by way of example an embodiment of the invention.

The fluid, such as the gases of the generator of a torpedo, the temperature of which it is desired to maintain at a constant value, circulates within the wall 1 and immersed therein is a coiled tube 2 filled with a liquid the vapor tension of which as a function of the temperature is known. This coiled tube (which could be also replaced by a straight tube) communicates through the conduit 3 with the bent pipe 4 similar to those used in dial manometers. It is known that the free end of this tube moves owing to the internal pressure which expands it. The curve of this movement is a function of the internal pressure and may be easily experimentally determined. It is possible therefore to know the law of the movement of the point 5 on the curve 6 which is substantially a straight line, as a function of the temperature of the fluid in 1. The liquid fuel, on reaching 7, passes into the chamber 8 and traverses the port 9 to reach the combustion chamber through the conduit 10.

As the drawing illustrates, a movable spindle 11 can more or less close the port 9. For this purpose, the spindle 11 is connected by means of a system of levers 12 and 13 to the point 5 which is the free end of the tube 4. The lever 13 oscillates about a stationary point 14. It is possible to amplify at will, the extent of the displacement of the point 5 and therefore to obtain, an extremely sensitive regulation.

In the case of a sudden rise in temperature within the chamber 1, the vapor tension in the tube 3 will also rise and the Bourdon tube will stiffen, the point 5 will reach, for example 5′, the lever 13 will be oscillated and the point 15 will move to 15′ and the spindle 11 will move to 11′ thus closing the fuel passage. In order that the Bourdon tube may not be affected by the pressure which the fuel exerts on the end of 11′ the spindle, this thrust is equilibrated by a spring 16 bearing, at one end upon a stationary part 18 and, at the other on a ring 17 located on the spindle. It is possible to modify at will, the degree of normal temperature by turning the ring 17 on the spindle.

Instead of acting on the fuel admission, the regulator may operate so as to regulate by means of a flap or throttle valve or the like the quantity of water injected into a generator of the kind above referred to.

I claim:

Apparatus of the kind described comprising valve actuating means, a lever pivoted intermediate its ends to said means, said lever being pivoted at one end to a stationary part of the construction, valve mechanism adapted to regulate the passage of fluid therethrough in direct proportion to its movement, and comprising a slide valve and a valve seat provided with a rectangular opening, and a direct connection between said valve and the free end of said lever.

In testimony whereof I affix my signature, in presence of two witnesses.

ROBERT DELAUNAY-BELLEVILLE.

Witnesses:
 HANSON C. COXE,
 EUICK KLOP.